United States Patent
Muehlbauer

(10) Patent No.: US 9,160,216 B2
(45) Date of Patent: Oct. 13, 2015

(54) GROUNDING DEVICE FOR ELECTRIC MACHINE AND METHODS OF ASSEMBLING THE SAME

(71) Applicant: Regal Beloit America, Inc., Beloit, WI (US)

(72) Inventor: Gerald R. Muehlbauer, Rib Mountain, WI (US)

(73) Assignee: REGAL BELOIT AMERICA, INC., Beloit, WI (US)

( * ) Notice: Subject to any disclaimer, the term of this patent is extended or adjusted under 35 U.S.C. 154(b) by 278 days.

(21) Appl. No.: 13/826,927

(22) Filed: Mar. 14, 2013

(65) Prior Publication Data

US 2014/0265746 A1    Sep. 18, 2014

(51) Int. Cl.
*H02K 11/00* (2006.01)
*H02K 11/04* (2006.01)

(52) U.S. Cl.
CPC .......... *H02K 11/0089* (2013.01); *H02K 11/046* (2013.01)

(58) Field of Classification Search
CPC .......... H02K 11/0089; H02K 11/0046; H02K 5/225; H02K 11/046
See application file for complete search history.

(56) References Cited

U.S. PATENT DOCUMENTS

| 4,443,726 | A * | 4/1984 | Ikegami et al. ................ 310/248 |
| 5,988,996 | A * | 11/1999 | Brookbank et al. ....... 417/423.3 |
| 7,136,271 | B2 | 11/2006 | Oh et al. |
| 8,169,766 | B2 | 5/2012 | Oh et al. |
| 2007/0040459 | A1 | 2/2007 | Oh |
| 2008/0258576 | A1 | 10/2008 | Oh et al. |
| 2013/0032373 | A1 | 2/2013 | Cutsforth |

FOREIGN PATENT DOCUMENTS

| DE | 102009004060 A1 | 7/2010 |
| DE | 202011106900 U1 | 2/2012 |
| JP | 60062847 | 4/1985 |

OTHER PUBLICATIONS

European Search Report, Application No. 14158994.5, dated Jul. 14, 2015, pp. 7.

* cited by examiner

*Primary Examiner* — Hanh Nguyen
(74) *Attorney, Agent, or Firm* — Armstrong Teasdale LLP

(57) ABSTRACT

In one aspect, a grounding device for an electric machine having a rotatable shaft is provided. The grounding device includes a wire core having a first end and a second end, and a plurality of conductive fibers coupled to the wire core and extending therefrom. The wire core is configured to couple to the electric machine with at least a portion of the plurality of conductive fibers contacting the shaft such that an electrostatic charge on the shaft is directed through the grounding device to ground.

18 Claims, 3 Drawing Sheets

GROUNDING DEVICE FOR ELECTRIC MACHINE AND METHODS OF ASSEMBLING THE SAME

BACKGROUND OF THE INVENTION

The field of the invention relates generally to grounding devices and, more particularly, to grounding devices for electric machines having stray electrostatic charges on a rotatable shaft.

Some known electric machines such as three-phase motors are driven by variable speed drives that may induce a voltage or electrostatic charge on the motor shaft. Some variable speed drives utilize pulse width modulation technology to vary the speed of AC motors, which allows use of less expensive AC motors in applications where more expensive DC motors may be used. A drawback of the use of AC motors with variable speed drives is that higher common mode voltage (CMV) is generated by the variable speed drive, which may increase induced currents on the shaft.

In some known motors, voltage or charges on the motor shaft induces current flow through the shaft bearings to the motor frame and then to ground. While the motor is running, the bearings become more resistive to current flow, causing a buildup of charge on the shaft surfaces. Over a short period of time, electrical charges to build to a high level. As the electrical charges pass the threshold level of the least electrically resistant path such as through the ball bearings on the shaft, a discharge of electrical energy passes through the least resistant path. This discharge causes electric discharge machining, which can damage the surfaces of the bearing races and the balls in the bearing if the least resistant path is through the bearings. This discharge may create fusion craters, and particulate matter from the crater formation may remain inside the sealed bearing. Both the fusion crater and the particulate material in the bearing may act to disturb the free flow rotation of the bearing, which may lead to physical damage and premature bearing failure.

A number of mitigation technologies have been used to overcome this problem. The technologies include conductive bearing grease, insulating the bearings, and using various brushes made of metal or other materials to ground the shaft. Such brushes are typically mounted in rigid holders and may be expensive and require lengthy installation procedures. Moreover, the brushes are designed only for a specific size motor shaft.

BRIEF DESCRIPTION OF THE INVENTION

In one aspect, a grounding device for an electric machine having a rotatable shaft is provided. The grounding device includes a wire core having a first end and a second end, and a plurality of conductive fibers coupled to the wire core and extending therefrom. The wire core is configured to couple to the electric machine with at least a portion of the plurality of conductive fibers contacting the shaft such that an electrostatic charge on the shaft is directed through the grounding device to ground.

In another aspect, an electric machine is provided. The electric machine includes a housing, a shaft rotatably coupled to the housing, a rotor coupled to the shaft, a stator coupled to the housing and a grounding device conductively coupled to ground through at least one of the housing and the stator. The grounding device includes a wire core having a first end and a second end, and a plurality of conductive fibers coupled to the wire core and extending therefrom. At least a portion of the plurality of conductive fibers contacts at least one of the shaft and the rotor such that an electrostatic charge on the shaft is directed to ground.

In yet another aspect, a method of assembling an electric machine is provided. The method includes providing a housing, rotatably coupling a shaft to the housing, coupling a rotor to the shaft, coupling a stator to the housing, and coupling a grounding device to ground through at least one of the housing and the stator. The grounding device includes a wire core having a first end, a second end, and a plurality of conductive fibers coupled to the wire core and extending therefrom. At least a portion of the plurality of conductive fibers contacts the shaft such that an electrostatic charge on the shaft is directed through the grounding device to ground.

DETAILED DESCRIPTION OF THE INVENTION

Electrostatic charges may build on rotating parts of electric machines. These charges may travel through and damage bearings used to support the rotating parts of the machines. Grounding devices may be used to bleed the electrostatic charge to ground. However, known grounding devices are expensive, are not adjustable to different sized machines, and/or require extensive installation and machining of the electric machine. Set forth herein are descriptions of systems and methods for an economical and efficient grounding device that is flexible and adjustable, which enables use with varying sized electrical machines.

Figure 1:
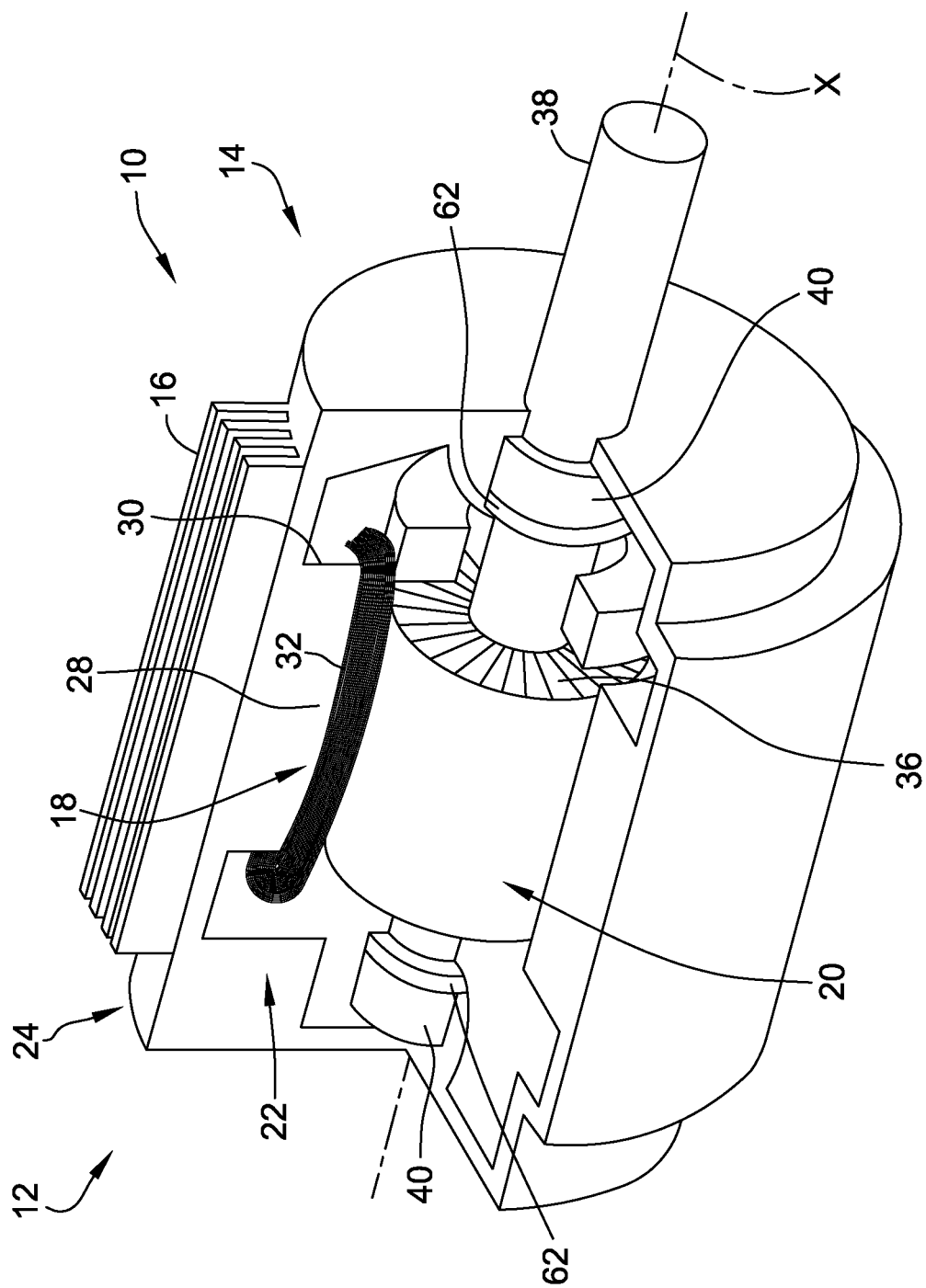
FIG. 1 is a perspective view of an exemplary electric machine.

FIG. 1 is a perspective cut-away view of an exemplary electric machine 10 that may be operated as either a generator or a motor. Electric machine 10 includes a first end 12, a second end 14, and a motor assembly housing 16. Electric machine 10 also includes a stationary assembly 18 and a rotatable assembly 20. Motor assembly housing 16 defines an interior 22 and an exterior 24 of machine 10 and is configured to at least partially enclose and protect stationary assembly 18 and rotatable assembly 20. Stationary assembly 18 includes a stator core 28, which includes a plurality of teeth 30 and a plurality of windings 32 wound around stator teeth 30. In the exemplary embodiment, stationary assembly 18 is a three-phase stator assembly and stator core 28 is formed from a stack of laminations made of highly magnetically permeable material. Alternatively, stationary assembly 18 is solid and/or is a single phase stator assembly. Stationary assembly 18 may be a round, segmented, or roll-up type stator construction and windings 32 are wound on stator core 28 in any suitable manner that enables machine 10 to function as described herein.

Rotatable assembly includes a permanent magnet rotor core 36 and a shaft 38 supported by bearings 40. In the exemplary embodiment, rotor core 36 is formed from a stack of laminations made of magnetically permeable material. Alternatively, rotor core 36 is a solid core. Rotor core 36 is substantially received in a central bore of stator core 28 for rotation along an axis of rotation X. FIG. 1 illustrates rotor core 36 and stator core 28 as solid for simplicity. While FIG. 1 is an illustration of a three-phase electric machine, the methods and apparatus described herein may be included within machines having any number of phases.

In the exemplary embodiment, electric motor 10 is coupled to a fan or centrifugal blower (not shown) for moving air through an air handling system, for blowing air over cooling coils, and/or for driving a compressor within an air conditioning/refrigeration system. More specifically, motor 10 may be used in air moving applications used in the heating, ventilation, and air conditioning (HVAC) industry, for example, in residential applications using ⅕ horsepower (hp) to 1 hp motors. Alternatively, motor 10 may be used in fluid pumping applications. Motor 10 may also be used in commercial and industrial applications and/or hermetic compressor motors used in air conditioning applications, where motor 10 may have a rating of greater than 1 hp. Although described herein in the context of an air handling system, electric motor 10 may engage any suitable work component and be configured to drive such a work component.

Figure 2:
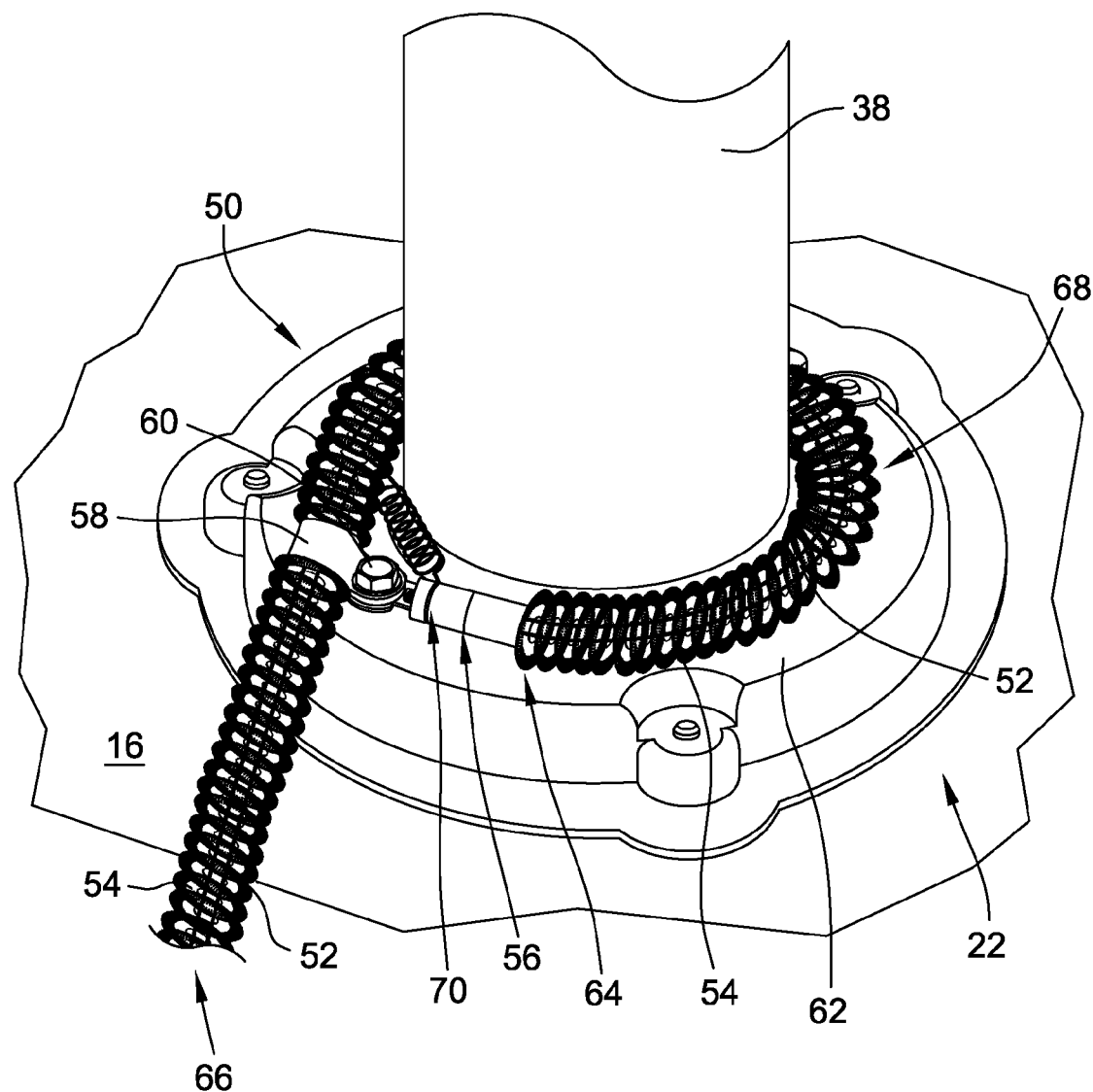
FIG. 2 is a perspective view of an exemplary grounding device that may be used with the electric machine shown in FIG. 1.
Figure 3:
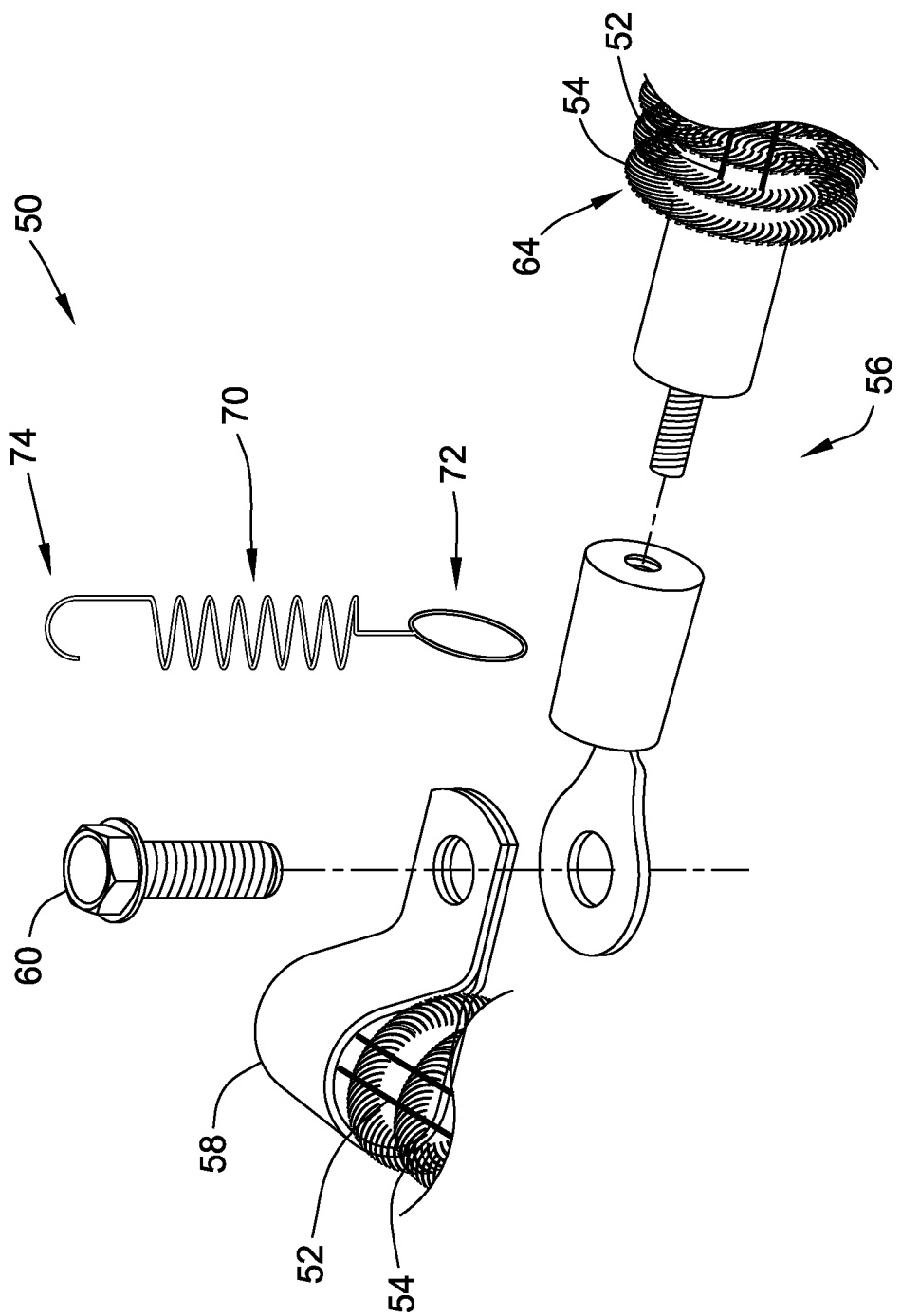
FIG. 3 is an exploded view of the grounding device shown in FIG. 2.

FIG. 2 illustrates an exemplary grounding device 50 that may be used with electric machine 10. However, grounding device 50 may be used with any suitable size or type electric machine. FIG. 3 is an exploded view of grounding device 50. Grounding device 50 generally includes a wire core 52, a plurality of semi-conductive or conductive fibers 54, a connection member 56, a clamp member 58, and a fastener 60. In the exemplary embodiment, grounding device 50 is coupled and/or grounded to a stationary component of electric machine 10 such as a bearing cap 62 coupled to housing 16. Alternatively, grounding device 50 may be coupled to any stationary component of machine 10 that enables grounding device 50 to function as described herein. For example, grounding device 50 may be coupled to a motor bracket (not shown), motor foot (not shown), housing 16, and/or stator core 28.

In the exemplary embodiment, wire core 52 is an electrically conductive wire that includes a first end 64 and a second end 66. However, wire core 52 may be fabricated from any suitable conductive material that enables grounding device 50 to function as defined herein. For example, wire core 52 may be fabricated from steel, copper, brass, and/or other metals or composites. Connection member 56 is coupled to wire first end 64, and clamp member 58 is coupled to wire core 52 between wire core first end 64 and second end 66. In the exemplary embodiment, fastener 60 extends through connection member 56 and clamp member 58 to couple connection member 56 and clamp member 58 to bearing cap 62. Although fastener 60 is illustrated as a screw, any suitable hardware may be used to couple connection member 56 and clamp member 58 to bearing cap 62 and/or any portion of machine 10. As used herein, suitable hardware means any combination of nuts, bolts, washers, screws, self tapping screws, welds, or any other suitable means for fastening the respective parts together for the purpose disclosed herein. Moreover, although one fastener 60 is illustrated, any number of fasteners may be used that enables grounding device 50 to function as described herein.

In the exemplary embodiment, wire core 52 is fabricated from a flexible material and is curved to form a loop portion 68. Connection member 56 and clamp member 58 are coupled to each other via fastener 60 to secure the curved orientation of wire core 52 and define loop portion 68. Grounding device 50 may be coupled to electric machine 10 within housing interior 22 or to the exterior of housing 16. Loop portion 68 extends about at least a portion of shaft 38 and is positioned such that at least a portion of the plurality of fibers 54 contact shaft 38. Alternatively, loop portion 68 is positioned about shaft 38 such that at least a portion of the plurality of fibers 54 are within a close proximity of shaft such that an electrostatic charge on shaft 38 can be electrically discharged to fibers 54 (i.e., fibers 54 are electrically coupled to shaft 38, but not in direct contact with shaft 38). Clamp member 58 is positionable along the length of wire core 52 between first end 64 and second end 66 such that the size of loop portion 68 is adjustable. Accordingly, because a diameter of shaft 38 may vary between different sized electric machines 10, clamp member 58 is positionable anywhere along the length of wire core 52 to define a suitably sized loop portion 68 formed around shaft 38. As such, grounding device 50 is adjustable to fit varying sized machines and/or shafts.

In the exemplary embodiment, at least a portion of the plurality of fibers 54 is in contact with shaft 38. Alternatively, at least a portion of fibers 54 is in contact with a surface of rotor core 36. However, fibers 54 may be in contact with any rotating component of electric machine 10. For example, fibers 54 may contact rotor end rings (not shown), and/or a fan or hub (not shown) mounted to shaft 38. In the exemplary embodiment, fibers 54 are spirally wound on wire core 52 and may have any suitable length. Alternatively, fibers 54 may be coupled to wire core 52 in any suitable pattern that enables grounding device to function as defined herein. In the exemplary embodiment, fibers 54 extend approximately 360° about wire core 52. In an alternative embodiment, fibers 54 extend approximately 180° about wire core 52. In yet another alternative embodiment, fibers 54 extend between approximately 60° and approximately 90° about wire core 52. However, fibers 54 may extend about wire core 52 in any suitable pattern that enables grounding device 52 to function as described herein. During use, fibers 54 may wear down or degrade due to contact with rotating shaft 38 or rotor core 36, and wire core 52 may be subsequently uncoupled from electric machine 10, rotated, and recoupled to electric machine such that unworn portions of fibers 54 are positioned in contact with shaft 38 and/or rotor core 36. This extends the useful life of grounding device 50 when some fibers 54 are not in contact with shaft 38 after initial installation on electric machine 10.

In the exemplary embodiment, fibers 54 are corrosion resistant acrylic fibers that include a conductive coating such as copper. Alternatively, fibers 54 are fabricated from any suitable electrically conductive or semi-conductive material that enables grounding device 50 to function as described herein. For example, fibers 54 may be fabricated from copper and/or carbon fiber.

In the exemplary embodiment, connection member 56 is made of an electrically conductive material and is coupled to wire core first end 64. Accordingly, connection member 56 facilitates electrically coupling wire core 52 to bearing cap 62 or other components of electric machine 10 that are electrically coupled to ground.

In the exemplary embodiment, grounding device 50 may also include a tensioning member 70 configured to bias wire core 52 and at least a portion of fibers 54 toward and into contact with shaft 38 and/or rotor core 36. As such, tensioning member 70 maintains an electrical connection between fibers 54 and shaft 38 and/or rotor core 36 even if fibers 54 wear down or wire core 52 moves during operation of electric machine 10. In the exemplary embodiment, tensioning member 70 is a spring. Alternatively, tensioning member 70 may be any biasing device that enables grounding device 50 to function as described herein. Tensioning member 70 includes a first end 72 coupled to connection member 56 and/or fastener 60 and a second end 74 coupled to wire core loop portion 68. Alternatively, tensioning member first and second ends 72 and 74 may be coupled to grounding device 50 at any location that enables biasing wire core 52 and/or fibers 54 toward shaft 38 and/or rotor core 36.

During installation, grounding device 50 is coupled to electric machine 10 in any suitable location on electric machine 10 that enables grounding device 50 to bleed an electric charge from shaft 38 to housing 16 and/or ground. Grounding device 50 is easily coupled to electric machine 10 unlike some known grounding devices where the electric machine must be machined and fitted with the grounding device. In some cases, the electric machine must be sent to a different facility for machining and installation, which is time consuming and may be difficult if the electric machine is very large. In contrast, a bore (not shown) may be easily formed in bearing cap 62 with a hand drill and grounding device 50 is coupled to bearing cap 62 with fastener 60. Accordingly, grounding device 50 is quickly and easily coupled to electric machine 10, thereby drastically reducing installation time and cost. Further, as described herein, grounding device 50 is quickly and easily adjustable to fit various sized shafts 38 or electric machine component.

During use of electric machine 10, an electrostatic charge may be produced on shaft 38. Grounding device 50 is coupled to a component of electric machine 10 such as bearing cap 62 such that wire core 52 and/or fibers 54 contact shaft 38 and/or rotor core 36. Electrically conductive wire core 52 and fibers 54 facilitate bleeding the electrostatic charge from shaft 38 and/or rotor core 36, through wire core 52 and to bearing cap 62 via connection member 56 and/or fastener 60. Bearing cap 62 may be electrically coupled to ground and effectively transfers the electrostatic charge out of electric machine 10 to ground.

An exemplary method of assembling electric machine 10 is described herein. Housing 16 is provided and shaft 38 is rotatably coupled to housing 16. Rotor core 36 is coupled to shaft 38 and stator core 28 is coupled to housing 16. Grounding device 50 is coupled to at least one of bearing cap 62, motor bracket 42, housing 16, and stator core 28 such that wire core 52 and/or at least a portion of fibers 54 are in contact with shaft 38 and/or rotor core 36. For example, connection member 56 is coupled to wire core first end 64 and clamp member 58 is coupled to wire core 52 between first and second ends 64 and 66. Connection member 56 and clamp member 58 are coupled to bearing cap 62 with fastener 60 such that a loop portion 68 is formed about shaft 38. Further, a tensioning member 70 is coupled to grounding device 50 to bias wire core 52 and/or fibers 54 toward and into contact with shaft 38.

Systems and methods for grounding an electrostatic charge on a shaft of an electric machine are provided herein. The system includes a flexible and adjustable grounding device that is coupleable to the electric machine. The device includes a wire core and a plurality of electrically conductive fibers that bleed the electrostatic charge from the electric machine to ground. The system is simple, inexpensive, and is quickly and easily installed on various sized electric machines.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A grounding device for an electric machine having a rotatable shaft, said grounding device comprising:
   a wire core having a first end and a second end;
   a plurality of conductive fibers coupled to said wire core and extending therefrom, wherein said wire core is configured to couple to the electric machine with at least a portion of said plurality of conductive fibers contacting the shaft such that an electrostatic charge on the shaft is directed through said grounding device to ground;
   a connection member coupled to said wire core first end;
   a clamp member coupled to said wire core between said first and second ends; and
   a fastener configured to couple said connection member and said clamp member to the electric machine.

2. The device of claim 1, wherein said plurality of conductive fibers are substantially spirally wound on said wire core.

3. The device of claim 1, wherein said plurality of conductive fibers are at least one of acrylic fibers, copper fibers, and carbon fibers.

4. The device of claim 1, wherein said plurality of fibers comprise a conductive copper coating.

5. The device of claim 1, wherein said wire core includes a loop portion configured to extend about the shaft such that at least a portion of said plurality of conductive fibers contact the shaft.

6. The device of claim 1, wherein said wire core is flexible.

7. The device of claim 1, wherein a size of said loop portion is adjustable by adjusting a location of said coupling between said clamp member and said wire core, the size of said loop portion being adjustable to fit different sized shafts.

8. The device of claim 1, further comprising a tensioning device coupled to said wire core, said tensioning device configured to bias at least a portion of said wire core toward the shaft to maintain contact between at least a portion of said plurality of conductive fibers and the shaft.

9. An electric machine comprising:
   a housing;
   a shaft rotatably coupled to said housing;
   a rotor coupled to said shaft;
   a stator coupled to said housing; and
   a grounding device conductively coupled to ground through at least one of said housing and said stator, said grounding device comprising:
   a wire core having a first end and a second end;
   a plurality of conductive fibers coupled to said wire core and extending therefrom, wherein at least a portion of said plurality of conductive fibers contacts at least one of said shaft and said rotor such that an electrostatic charge on said shaft is directed to ground;
   a connection member coupled to said wire core first end;
   a clamp member coupled to said wire core between said first and second ends; and
   a fastener configured to couple said connection member and said clamp member to the electric machine.

10. The electric machine of claim 9, wherein said housing includes at least one of a bearing cup and a motor bracket, said grounding device coupled to at least one of said bearing cup and said motor bracket.

11. The electric machine of claim 9, wherein said wire core includes a loop portion configured to extend about the shaft such that at least a portion of said plurality of conductive fibers contact the shaft.

12. The electric machine of claim 9, wherein said wire core is flexible.

13. The electric machine of claim 9, wherein a size of said loop portion is adjustable by adjusting a location of said coupling between said clamp member and said wire core, the size of said loop portion being adjustable to fit different sized shafts.

14. The electric machine of claim 9, further comprising a tensioning device coupled to said wire core, said tensioning device configured to bias at least a portion of said wire core toward the shaft to maintain contact between at least a portion of said plurality of conductive fibers and the shaft.

15. A method of assembling an electric machine, said method comprising:
   providing a housing;
   rotatably coupling a shaft to the housing;
   coupling a rotor to the shaft;
   coupling a stator to the housing;
   coupling a grounding device to ground through at least one of the housing and the stator, the grounding device including a wire core having a first end, a second end, and a plurality of conductive fibers coupled to the wire core and extending therefrom, wherein at least a portion of the plurality of conductive fibers contacts the shaft such that an electrostatic charge on the shaft is directed through the grounding device to ground;
   coupling a connection member to the wire core first end;
   coupling a clamp member to the wire core between the core first end and second end; and
   coupling the clamp member and the connection member to at least one of the housing and the stator.

16. The method of claim 15, wherein the wire core includes a loop portion extending about the shaft.

17. The method of claim 15, further comprising adjusting a size of the loop portion such that at least a portion of the plurality of conductive fibers contact the shaft.

18. A grounding device for an electric machine having a rotatable shaft, said grounding device comprising:
   a wire core having a first end and a second end;
   a plurality of conductive fibers coupled to said wire core and extending therefrom, wherein said plurality of conductive fibers are substantially spirally wound on said wire core, wherein said wire core is configured to couple to the electric machine with at least a portion of said plurality of conductive fibers contacting the shaft such that an electrostatic charge on the shaft is directed through said grounding device to ground.

\* \* \* \* \*